May 19, 1925.  1,538,558

E. A. ILEMAN

REGULATING VALVE

Filed Dec. 7, 1922   2 Sheets-Sheet 1

INVENTOR
E. A. Ileman
BY
ATTORNEYS

May 19, 1925. 1,538,558
E. A. ILEMAN
REGULATING VALVE
Filed Dec. 7, 1922 2 Sheets-Sheet 2
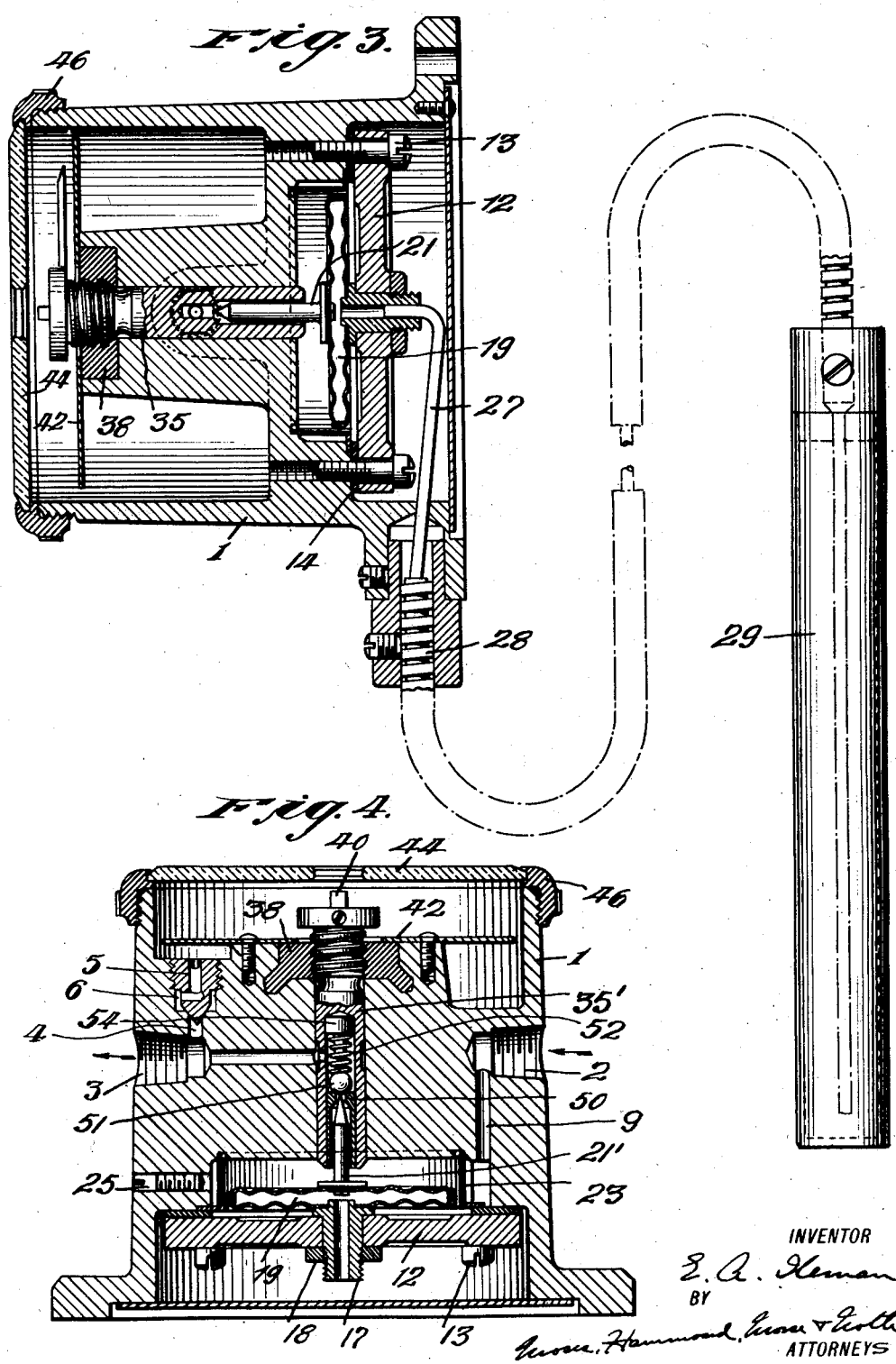

Patented May 19, 1925.

1,538,558

UNITED STATES PATENT OFFICE.

EMIL AUGUST ILEMAN, OF QUEENS, NEW YORK, ASSIGNOR, BY MESNE ASSIGNMENTS, TO AMERICAN SCHAEFFER & BUDENBERG CORPORATION, OF BROOKLYN, NEW YORK, A CORPORATION OF NEW YORK.

REGULATING VALVE.

Application filed December 7, 1922. Serial No. 605,544.

*To all whom it may concern:*

Be it known that I, EMIL AUGUST ILEMAN, a citizen of Germany, residing in Queens, Long Island, and State of New York, have invented certain new and useful Improvements in Regulating Valves, of which the following is a specification.

This invention relates to regulating valves and is particularly, although not exclusively, useful in connection with temperature regulating apparatus, and will be hereinafter described as embodied in apparatus of that kind. It is to be understood, however, that the invention is also useful in connection with pressure controlling, refrigerating, and other kinds of apparatus; and that it is not to be regarded as limited in its application to controlling apparatus used for any particular purpose.

Inasmuch as the embodiment of the invention hereinafter described is particularly adapted for use in a temperature regulating system, it may be stated that temperature regulating valves may be divided, generally speaking into two classes; (*a*) the self contained type, in which the flow of the tempering medium is controlled by a valve which is directly operated by a thermostatic element. (*b*) The auxiliary type, in which the tempering medium is controlled by a valve which is actuated by some auxiliary medium, such as air, water or steam pressure, the supply of which is controlled by an auxiliary controlling valve operated by a thermostatic element. It is to this last mentioned type that the invention herein described is particularly applicable.

The general object of the present invention is to provide a new and improved regulating valve which will be simple and accessible in construction and efficient and reliable in operation, easily adjusted so as to operate at different temperatures, and highly sensitive to variations in temperature.

The characteristic novel features of the invention will be pointed out in the appended claims.

Figure 1:
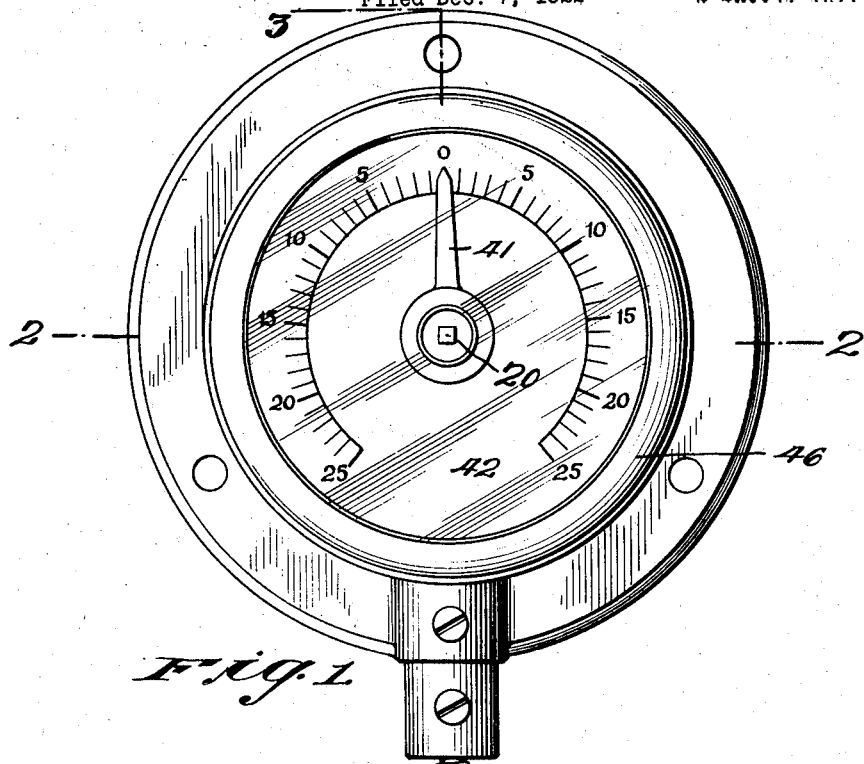
Figure 2:
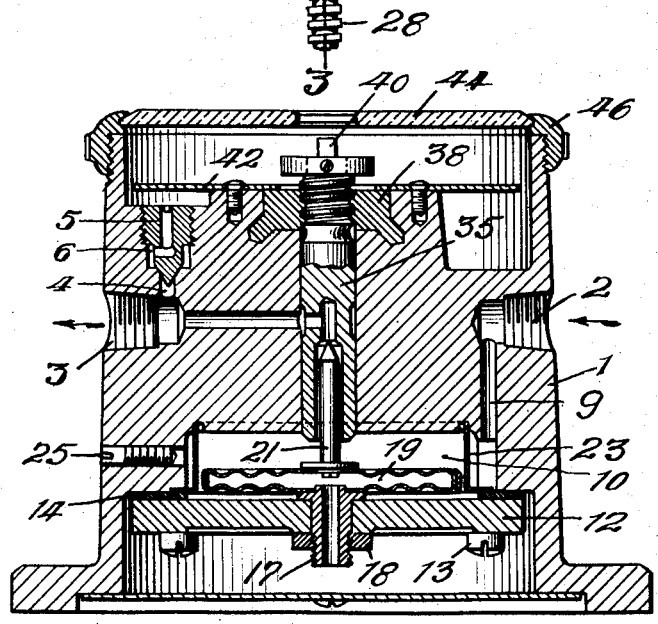

Referring to the drawings, Figure 1 is an elevation showing the dial portion of a regulating valve having my invention embodied therein; Figure 2 is a sectional view on the line 2—2 of Figure 1; Figure 3 is a sectional view on the line 3—3 of Figure 1, a temperature responsive element or bulb being shown attached to the valve mechanism; and Figure 4 is a sectional view, similar to Figure 2, showing a modified form of the invention.

Referring to the drawings, the various parts of the regulating valve are shown as supported by a supporting member or casing which may be a casting 1 the form of which will be apparent from the drawings. As shown, the casting 1 has an inlet passage 2 and an outlet passage 3 adapted to receive the ends of pipes leading, respectively, to a supply of compressed air or other medium and to the valve or other device to be actuated. Communicating with the outlet passage 3, is vent 4, for a purpose hereinafter described, the size of which may be regulated by a pointed plug 5, of the form shown, threaded in a hole 6 in the casting 1 communicating with the vent 4. It will be noted that the plug 5 is axially and radially drilled so that a free passage is provided from the vent 4 when the pointed end of the plug 5 is out of contact with the mouth of the vent 4. The effective area of the vent 4 can thus be very nicely regulated by screwing the plug 4 in and out, a screw driver slot being provided in its outer end to facilitate its adjustment. The inlet opening 2 connects thru a passage 9 with a cavity or chamber 10 in the back of the casting 1. The outer wall of this chamber is formed by a plate 12 secured to the casting 1 by screws 13, a gasket 14 being preferably interposed between the plate 12 and the casting 1 so as to make a tight joint. Passing thru a hole in the center of the plate is a thimble 17 of the form shown, provided at one end with a flange which engages one side of the plate 12, and at the other end with a threaded portion adapted to receive the nut 18, which engages the other side of said plate 12. Secured to the thimble 17 is an expansion chamber 19, preferably made of two diaphragm shells as shown, one shell being connected with the thimble 17, and the other shell carrying a valve stem or plunger 21, as clearly shown in the drawing. Surrounding the expansion chamber 19 within the chamber 10 is preferably arranged a strainer 23 which serves to prevent dirt from passing thru the regulating valve, along with the compressed air or other medium the passage of which the valve is intended to control. In order to permit any trapped dirt to be blown out at intervals, the casting 1 is preferably provided with an opening normally closed by a removable plug 25. As best shown in Figure 3, there is attached to the opening thru the thimble 17 a tube 27 which extends out of the cavity in the back of the casting 1 and thru a flexible pipe 28 to a bulb 29. The tube 27, pipe 28 and bulb 29 may be of any well-known form, and as usual they and the expansion chamber 19 may be wholly or partially filled with an expansible fluid such as alcohol. It will also be understood that the bulb 29 may be located at a distance from the regulating valve, at the place the temperature of which is to govern the operation of the regulating valve through the expansion and contraction of the expansion chamber 19 and the consequent movement of the valve stem 21.

In the form of controlling valve shown in Figures 2 and 3, the valve stem 21 which at its free end is pointed as shown, co-operates with a valve seat formed in an adjustable spindle 35 of the form shown. It will be noted that the spindle 35, about midway of its length, is grooved and that this groove communicates with the valve seat in the spindle 35 thru a hole drilled therein. It will also be noted that the groove in the spindle 35 registers with a passage leading to the outlet opening 3 in the casting 1. Longitudinal adjustment of the spindle 35 in the casting 1 is made possible by providing the spindle with threads near its outer end which engage threads in a nut 38 secured in the casting 1. In order to facilitate adjustment of the spindle 35, its outer end is provided with a squared portion 40 adapted to receive a key, and with a pointer 41 arranged to move over a scale plate 42 secured to the casting 1 as shown. The pointer 41 and the scale plate 42 are covered by a crystal 44 having a hole in its center thru which the key may be inserted, and secured to the casting 1 in any suitable manner as by means of a frame 46 making threaded engagement with the outer end of casting 1. By the use of a key adapted to fit the squared end 40, the spindle 35 may be adjusted so as to move the valve seat therein toward or away from the end of the valve stem 21, thereby permitting the valve to be adjusted so that it will operate at different temperatures in the place where the bulb 29 is located.

With the form of structure shown in Figures 2 and 3, the valve will close and remain closed while the temperature at the place where the bulb 29 is located exceeds a certain value. In the construction shown in Figure 4, which will now be described, the valve will open and remain open when the temperature at the point where the bulb 29 is located exceeds a certain value.

In the regulating valve shown in Figure 4, the various parts may be the same as the parts hereinbefore described in connection with the form of the invention shown in Figures 2 and 3, with the exception of the valve spindle 35' and the parts carried thereby and the valve stem or plunger 21'. As clearly shown in Figure 4, the spindle 35' is bored out at one end to provide a chamber within which is secured a valve seat 50 with which co-operates a ball valve member 51. The ball 51 is yieldingly held in engagement with the valve seat 50 by means of a spring 52 arranged, as shown, around a guiding pin extending from a plug 54 located at the inner end of the chamber within the spindle 35'. As in the form of regulating valve shown in Figures 2 and 3, the spindle 35' in the regulating valve of Figure 4 is provided with an annular groove which registers with a passage leading to the outlet opening 3 in the casting 1; said groove being connected by a hole thru the spindle 35' with the valve chamber within the latter. As clearly shown in Figure 4, the valve stem 21' is provided with a pointed end which is adapted to project thru the valve seat 50 and engage the ball 51 for the purpose of lifting the latter from the valve seat against the pressure exerted by the spring 52. It will be obvious that rotary adjustment of the spindle 35' by means of a key, (as hereinbefore described in connection with the structures of Figures 2 and 3) will move the valve seat 50 and the ball 51 toward or away from the end of the valve stem 21', thereby adjusting the valve for operation at different temperatures at the place where the bulb 29 is located. When the temperature at the location of the bulb 29 exceeds a certain value, expansion of the volatile fluid within the bulb will cause enlargement of the expansion chamber 19 with consequent movement of the valve stem 21' and the lifting of the ball 51 from the valve seat 50. This will permit compressed air or other medium to pass from the inlet opening 2 thru the passage 9, thru the screen 23 and into the chamber 10, and thence thru the space between the valve stem 21' and the valve seat 50 and thru the latter, and then thru the passage leading from the valve chamber to the outlet passage 3. On the contrary, when the temperature at the place where the bulb 29 is located is below a certain value, the valve stem 21' will be withdrawn from engagement with ball 51 and the latter will engage the valve seat 50 and will prevent passage of the actuating medium thru the regulating valve.

It will be understood that the compressed air or other medium, the passage of which the valve mechanisms herein described are intended to regulate, is ordinarily used to control a valve or other device to which the air passes thru a pipe connected to the outlet passage 3. With this in mind, it will be understood that the vent 4 serves to release the pressure in this pipe when the regulating valve is in its closed position, altho the leakage thru said vent when the regulating valve is open is insufficient to interfere with the building up of pressure in the pipe sufficient to operate the valve or other device to be controlled. This permits the maintenance of a variable pressure in the pipe leading to the controlled valve or other device, and the holding of the latter in a "throttling position" with consequent efficient results.

It will be noted that, in both of the valve constructions hereinbefore described, the expansion chamber 19 on its outside is continually subjected to the pressure of the compressed air or other medium the passage of which the valve mechanism is intended to regulate. This offers important advantages, since due to the counterpressure of the compressed air or other medium outside the expansion chamber, the differential pressure actuating on the expansion chamber is smaller which permits the use of a thinner material for the diaphragm shells with correspondingly larger movement of the valve stem 21 or 21' per lb. of pressure change within the expansion chamber; or the arrangement just mentioned permits the use within the bulb 29 of a liquid with a higher vapor tension for a certain temperature, which means a larger pressure increase per degree of temperature rise. In both cases the sensitiveness of the regulating valve is materially increased.

Other advantages offered by the invention will be obvious from consideration of the two embodiments thereof herein shown and described.

While I have shown certain forms in which my invention may be embodied, it is to be understood that these may be modified in some respects without departing from the spirit of the invention as defined in the appended claims.

What I claim is:

1. In a pressure actuated valve mechanism, a valve member, a valve seat therefor, actuating means connected to said valve member and responsive to pressure applied to it from an outside source, and a casing forming both a chamber for said pressure responsive actuating means and a passage to the valve seat for the medium which said valve is intended to control.

2. In a valve mechanism for regulating the passage of a medium under pressure, a valve member, a valve seat therefor, a chamber maintained at the inlet pressure of said medium, and a valve operating member located in said chamber and actuated by variations in pressure applied to it from an outside source.

3. In a valve mechanism for regulating the passage of a medium under pressure, a chamber maintained at the inlet pressure of said medium, a movable valve member, and a valve operating member located in said chamber and subject to the pressure therein and actuated by variations in pressure applied to it from an outside source.

4. In a valve mechanism for regulating the passage of a medium under pressure, a chamber adapted to be connected to the source of supply of said medium, a valve controlling the passage of said medium out of said chamber, and a pressure responsive element located in said chamber and actuated by variations in pressure applied to it from an outside source and operatively connected to said valve.

5. In a valve mechanism for regulating the passage of a medium under pressure, a valve, and means for opening and closing said valve actuated by variations in pressure applied to it from an outside source and by inlet pressure constantly applied to it by said medium.

6. In a valve mechanism for regulating the passage of a medium under pressure, a valve, and means for opening and closing said valve actuated by the resultant of opposed pressures constantly exerted by the inlet pressure of said medium and from an outside source.

7. In a valve mechanism for regulating the passage of a medium under pressure, a chamber constantly maintained at the pressure of said medium, a valve controlling the passage of said medium out of said chamber, an expansion chamber located in said first-mentioned chamber and constantly subjected on all sides to the pressure of said medium, means for connecting the inside of said expansion chamber to an outside source of variable pressure, and an operative connection between said expansion chamber and said valve whereby the latter is controlled.

8. A valve mechanism for regulating the passage of a medium under pressure in response to variations in temperature at a certain place comprising, a chamber constantly maintained at the pressure of said medium, a valve controlling the passage of said medium out of said chamber, an expansion chamber located in said first mentioned chamber and constantly subjected internally to a pressure corresponding to the aforesaid temperature and externally to the supply pressure of said medium, and an operative connection between said expansion chamber and said valve whereby the latter is controlled.

9. A valve mechanism for regulating the passage of a medium under pressure in response to variations in temperature at a certain place comprising, a body member containing a chamber constantly maintained at the pressure of said medium, a valve controlling the passage of said medium out of said chamber, a plate adapted to be secured to said body member and forming a wall of said chamber, an expansion chamber attached to the inside of said plate and located in said first mentioned chamber and constantly subjected internally to a pressure corresponding to the aforesaid temperature and externally to the supply pressure of said medium, and an operative connection betwen said expansion chamber and said valve whereby the latter is controlled.

In testimony whereof I have affixed my signature to this specification.

EMIL AUGUST ILEMAN.